Dec. 28, 1954 A. Z. RICHARDS, JR 2,697,937
SOIL TESTING EQUIPMENT AND GROUND ANCHOR FOR THE SAME
Filed Sept. 19, 1952 2 Sheets-Sheet 1
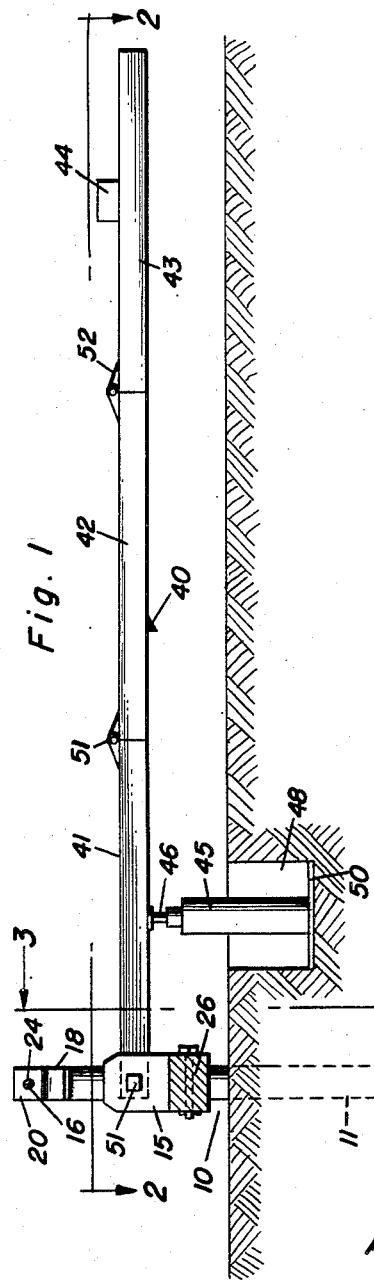
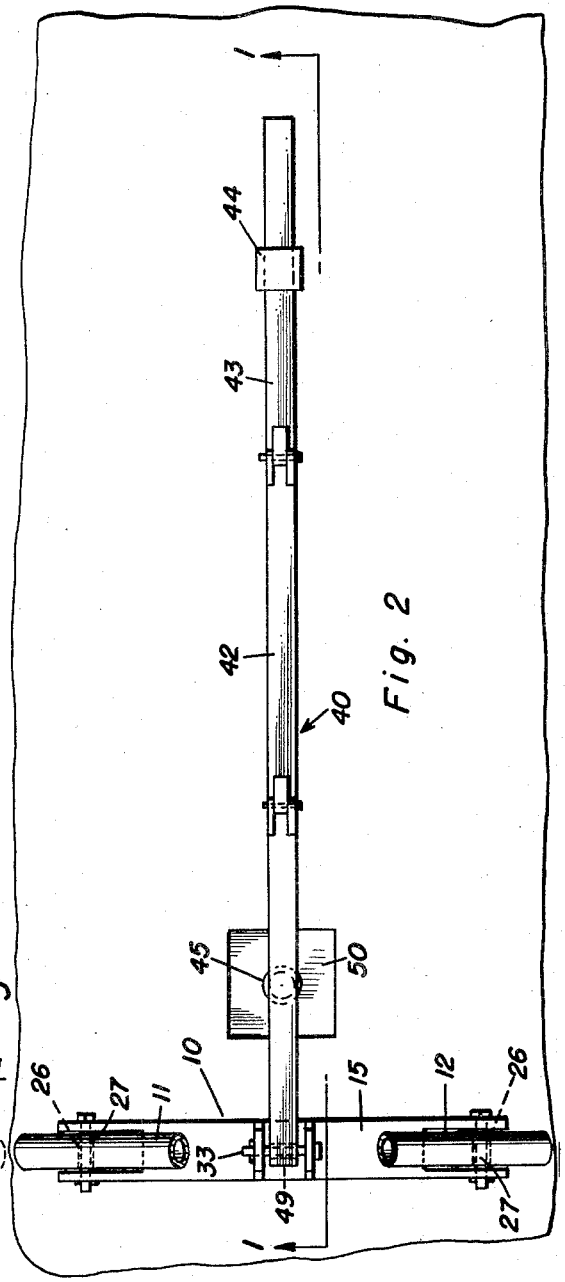
Albert Zabriskie Richards, Jr., INVENTOR.

Dec. 28, 1954  A. Z. RICHARDS, JR  2,697,937
SOIL TESTING EQUIPMENT AND GROUND ANCHOR FOR THE SAME
Filed Sept. 19, 1952  2 Sheets-Sheet 2
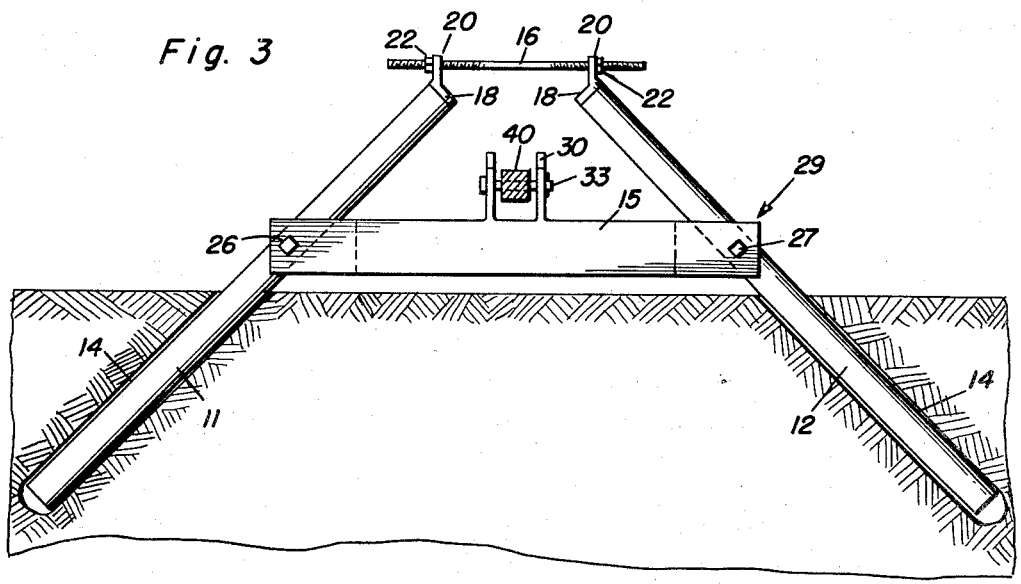
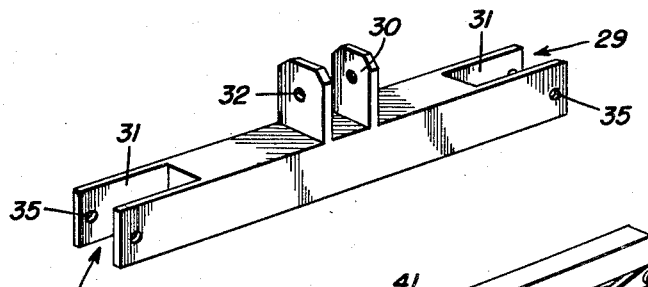
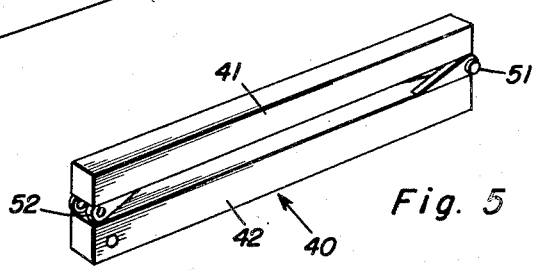
Albert Zabriskie Richards, Jr.
INVENTOR.

United States Patent Office 2,697,937
Patented Dec. 28, 1954

2,697,937

SOIL TESTING EQUIPMENT AND GROUND ANCHOR FOR THE SAME

Albert Zabriskie Richards, Jr., Salt Lake City, Utah

Application September 19, 1952, Serial No. 310,491

4 Claims. (Cl. 73—84)

This invention relates to soil testing and to ground or earth anchors used in connection with soil testing devices and it has for its principal object to provide a soil testing equipment provided with an earth or ground anchor and connectible with the same which is simple and portable and which combines ease of handling, of installation and of removal, thus producing a portable soil tester which may be moved around from place to place and installed and removed for tests carried out in many places without requiring time and labor consuming preparations.

It will be clear that when structures or buildings of any type or kind have to be erected on questionable soil or in those cases in which a heavy load has to be applied which is near the limit of the bearing capacity of the soil, it is sometimes necessary to make a large number of field tests in order to determine safe foundation loads for the design of the building or other structure which is to be erected.

However, the procedure so far followed for obtaining field tests is rather an elaborate one which does not lend itself to a constant shifting of the testing places. In order to anchor the test equipment firmly, a log of relatively large dimensions (a so called "dead man") is usually buried in the ground with a cable or rope attached to it and this cable or rope is then attached to the test equipment to counteract or take up the upwardly directed reaction forces which are produced when heavy downward pressure is applied for the purpose of measurement, in order to measure the bearing capacity of the soil. Further, in order to apply a measured pressure to a certain area, the usual procedure consists in constructing a balanced platform with a single column base and to load said platform with sand bags or pig iron weights, etc., to the desired extent. The settlement of the base which takes place under this load is then measured and this data is used to determine safe loads for the design of the structure or building.

The "dead man" and the cable or rope attached to it can usually not be recovered on account of the amount of labor involved, so that this type of equipment depends on elements which must be renewed for each measurement.

The invention consists in replacing this equipment which, while transportable is not of the easily portable type, and which requires the use of local resources not always available, by completely portable equipment which is easily assembled and disassembled on the site of the measurement. Such a portable equipment is in the first place dependent on a suitable anchoring means for counteracting the very considerable pressures which have to be applied to the test equipment when the test is made. Further, the portability of the equipment is also connected with the weight and size of the elements and with the ease with which the assembling of the separate parts can be performed and with which the test pressure producing elements may be joined to the anchor element and applied to those parts which transmit the pressure to the ground.

Ground or earth anchors by themselves are known, but differ from ground anchors usable for the purpose above described in that the direction of the forces they have usually to transmit differ very materially. Practically all ground or earth anchors have to transmit either downwardly directed forces, which are directed towards the ground, and are to be transmitted to the ground in the same direction, or said anchors have to take up laterally directed forces, such as those produced by the wind, by guy wires or by a combination of the above mentioned forces. Such ground or earth anchors are, therefore, usually not usable for the purpose of taking up essentially upwardly directed forces. Further, and this is a most important point, earth anchors are usually permanent structures connected with the ground which cannot be removed except by a laborious process.

The ground anchor for a field test equipment cannot form a permanent part of the ground to be tested, but must form a permanent part of the equipment and, therefore, must be a type of structure which is easily removable from the ground and which may easily be inserted.

It is, therefore, one of the principal objects of the invention to provide anchoring means which are placed into the operative position within the ground with ease and which are removable from the ground without difficulty.

A further object of the invention consists in providing an equipment and especially a ground and earth anchor which consists of a number of separate parts which are merely assembled during the test and are disassembled afterwards, each part being of limited size and weight, but which when assembled provide a solid anchoring means withstanding heavy pressures.

It is a further object of the invention to provide testing equipment to be joined to or connected with an earth or ground anchor and which is likewise portable and consists of separate elements which may be easily assembled and disassembled and may be joined to the ground or earth anchor when it is in its operating position by simple operations.

Further objects of the invention of a more specific nature will, therefore, be mentioned in the following detailed specification.

The invention is illustrated in the accompanying drawings which show one embodiment of the invention by way of example. It is, however, to be understood that this embodiment of the invention has been selected as an example in order to be able to explain the principle of the invention and the best mode of applying the principle. The example illustrated serves as a guide for those skilled in the art, but is not to be considered as limitative, and departure from the embodiment illustrated in the drawings is not necessarily a departure from the principle of the invention.

In the drawings:

Figure 1 is a sectional elevational view of the assembled soil testing device, the section being taken along the line 1—1 of Figure 2;

Figure 2 is a sectional plan view of the assembled device the section being taken along the line 2—2 of Figure 1;

Figure 3 is an elevational side view of the equipment partly in section, the section being taken along the line 3—3 of Figure 1; and Figures 4 and 5 are perspective views of details.

As is well known, it is necessary, when erecting a building or structure of any kind, to determine the bearing capacity of the soil on which the foundations of the structure or building rests and for this purpose bearing capacity tests must be conducted which provide the designers with the basic data for a safe foundation load. In many cases field tests must be conducted by means of testing apparatus which have to shift from place to place in order to assemble the necessary variety of data. Also, sometimes a large number of such tests in widely scattered localities must be conducted.

The test is usually conducted by measuring the settlement or displacement of a test plate on the soil to be tested under a given load. However, in order to apply the required pressure which is, of course, relatively heavy, it is necessary to provide a fixed point or a fixed structure for taking up the reaction counteracting the pressure exerted by the pressure applying apparatus. As the pressure is regularly downwardly directed the fixed point of the test apparatus has to take up an upwardly directed reaction force. It is thus necessary to provide a portable and easily assembled and disassembled structure, incorporating means for applying a measurable downward pressure, and an anchoring means of the same type providing a fixed point for taking up the reaction and capable of withstanding considerable, upwardly directed, uplifting forces amounting to several tons without undergoing any change of position.

As such an instrument is not now available, the invention essentially consists in providing an instrument of the type mentioned, and especially in providing a ground or earth anchor consisting of a plurality of separate pieces or elements which may be easily assembled and disassembled and which may be joined with the means for exercising the required downward pressure in such a manner that the pressure applied to the test apparatus will find its fixed point in the said anchor.

The equipment for testing the bearing capacity of a soil according to the invention comprises essentially the ground or earth anchor 10 which is in this case a composite structure resisting the lifting forces. As shown in Figure 3, the anchor consists of four separate parts which may be joined by suitable elements. The anchor consists of the two anchor stakes or legs 11, 12 preferably made of structural steel or of section of a heavy pipe, which stakes or legs are joined by a cross beam 15 and by a tension adjusting rod 16.

The anchor stakes or legs 11, 12 are placed into holes 14 made in the ground at a suitable angle to the horizontal which is approximately 45°, which are inclined toward each other; further they are approximately inclined symmetrically with respect to a vertical line of symmetry drawn between them.

The angle may, of course, be somewhat adjusted to the local conditions but should always be approximately in the vicinity of 45°.

The two anchor stakes or legs 11, 12 are each provided with a cap 18 carrying a bracket 20 which projects from the cap at an angle which is so chosen that when the anchor stakes or legs are in the ground in their proper position the said brackets are approximately in a vertical position. Each bracket 20 is provided with an eye 24 through which a tension adjustment rod 16 passes.

Each of the anchor legs 11, 12 are further provided with a transverse bore or hole 26 for the passage of bolts 27 which join the cross beam 15 to the anchor stakes or legs 11, 12. The cross beam 15 is preferably also made of structural steel and in order to enable the cross beam to transmit considerable loads it is bifurcated at its ends 29 and provided with side or cheek plates 31 which are placed astride of the anchor leg members holding the latter between them. The side or cheek plates are provided with suitable bores 35 which may be aligned with the bores 26 in the anchor legs so that the bolts 27 may firmly join the cross beam 15 with the said legs 11, 12.

On its upper side the cross beam 15 is provided with two lugs forming projections 30, each of said lugs being provided with a bore 32 through which a bolt 33 holding the beam of the pressure device may pass.

As above stated, the tension adjusting rod 16 is passed through the eyes 24 of the bracket 20. The rod is threaded and carries nuts 22, drawing the two ends of the anchor stakes or legs which are provided with the bracket 20 together as far as possible. In this way the relative position of the two legs and also the position of the legs 11, 12 within the holes 14 in the ground may be adjusted. During such adjustment the legs practically pivot around the bolts 27 while the lower or buried ends of the legs move upwardly within the holes 14.

The cross beam 15 supports the pressure device by means of a bolt 33 passing through the bores 32 of the lugs 30. This pressure device consists of a loading beam 40 which may be of considerable length and which applies its own weight, which may be supplemented by a weight 44 or a plurality of weights, only diagrammatically indicated in Figures 1 and 2. The loading beam, as seen in Figure 1, rests on a block or column 45 which may be made of timber and which in its turn passes the pressure onto the steel bearing plate 50 which is usually round and of predetermined area. Between the block 45 and the loading beam 40 a hydraulic or a mechanical type of jack 46 is preferably inserted which is used for the purpose of compensation and which is so adjusted that it keeps the loading beam 40 level in all positions.

The loading beam 40 consists preferably of hinged sections 41, 42, 43 which are joined by suitable hinge pins 51, 52 which pins may be withdrawn from the hinges so as to permit transportation of the loading beam in separate sections or which may be so arranged that the loading beam may be folded for transportation. A partly folded loading beam is illustrated in Figure 5. If the loading beam has more than two sections it may be so arranged that two adjacent sections are always foldable while the connection with further sections is made by hinge pins which may be withdrawn.

To apply the steel bearing plate 50 against the soil to be tested preferably a small pit 48 is dug out in the soil and the bearing plate 50 is placed on the level bottom of said pit.

As seen from the above description all the elements which are used are either separate pieces or are pieces which can be folded and the length and weight of which does not exceed very moderate values. Nevertheless, the assembling for test purposes is a very simple operation as it entails merely inserting of bolts and the screwing down of nuts or the like.

For carrying out a test holes must be bored into the ground at an angle of approximately 45° from horizontal, sloping away from each other at the site of the test which holes have to be bored in such a manner that they are a certain distance apart. This is done by means of a post hole auger or by a boring machine, if available.

The distance of the holes in the ground is so selected that it is a little larger than the length of the cross beam 15. When the two holes have been made, anchor stakes or legs 11, 12 are inserted into the holes and the cross beam is then mounted by aligning the holes 35 and the cheek plate 31 of the cross beam with the holes 26 passing through the anchor legs and by passing the bolts 27 through these aligned openings, securing the bolts in their places in any suitable manner. The two anchor stakes or legs, when joined by the cross beam, thus form a system in which the anchor legs are adjustable around the pivots 27.

The tension adjustment rod 16 is then passed through the openings 24 in the bracket 20 and the nuts 22 are now tightened drawing the top ends of the anchor stakes or legs towards each other. While the upper ends thus move towards each other the lower ends of the anchor stakes or legs perform an angular movement around the pivot bolts 27 of the cross piece and they are tightly pressed against the earth at the upper side of the holes. When this adjustment has been performed the anchor forms a unit which may take uplifting forces which act upon it.

After a small pit 48 has been dug out and the steel plate 50 has been inserted covering its bottom, the pole or column 45 is inserted and is placed on the steel plate, the jack 46 is then placed on the column and is adjusted so that its upper surface supports the beam 40 in a horizontal position. The beam 40 is then placed on the jack and its end, which is also provided with a hole 49, is placed between the two lugs 30 and is attached to the cross beam 15 by means of the pivot bolt 33.

When the weight or weights 44 are now placed on the beam, the weight will act through the jack 46 and the column 45 on the plate 50, the force applied being proportional to the lengths of the lever arms relatively to the fulcrum which is represented by the axis of the bolt 31. This weighting of the beam produces a reaction force which has to be taken up by the cross beam 15 and which is transmitted from the cross beam to the anchor stakes or legs. In the underground portions of the anchor legs obviously upwardly directed reaction forces will manifest themselves which must be taken up by the earth. Considerable forces may clearly be applied as manifestly the ground may take up any force which is less than the resistance of the soil against pulling the anchor stakes 11, 12 vertically out of the ground. The resistance against such a movement of the anchor stakes has usually a very high value and in almost all cases amounts to several tons even in a soft soil. In order to loosen the anchor to permit lifting of the anchor stakes or legs the ground must be ruptured by the anchor stakes and this can usually not occur with an instrument of this type and with the test loads which are applied to it.

The test load which acts upon the steel plate 50 and which is applied against the soil to be tested consists of the weight of the beam (varying with the number of sections of the beam which are in use) and of the weight which has been placed on the beam and the weight applied is regulable according to its distance from the fulcrum pin or bolt 33. The settling of the plate 50 under varying load conditions are measured in the usual manner by the usual implements such as an engineer's level, a leveling rod, etc.

It will be seen from the above that in this mechanism each part is so designed that it is easily handled, placed and removed and that each part is of such size that it is easily portable. This feature, especially the ease of the assembling and disassembling of the elements may be said to be the main feature of the invention.

It will be understood that the above described elements may be used and arranged also in different manners and that unessential changes may be made in the whole system without in any way departing from the invention as defined in the annexed claims.

Having described the invention, what is claimed as new is:

1. In a soil testing device, a portable ground anchor, comprising a plurality of separate members, the latter including anchor stakes adapted to be inserted into preformed holes in the ground and, when inserted, inclined towards the horizontal and towards each other, partly being below ground and partly projecting above ground, a cross beam pivotally joining the anchor stakes above ground intermediate the ends of said stakes and means at the ends of the anchor stakes projecting above ground for drawing said ends together, thus moving the buried portions of the stakes outwardly within the holes.

2. A portable ground anchor as claimed in claim 1 wherein the means for drawing together the anchor stakes consist in a cap provided on each anchor stake, a bracket on each of said caps having an eye, a tension adjustment rod passing through the eyes and means on said rod for exerting an inwardly directed pressure on said brackets and anchor stakes.

3. A soil testing device comprising a portable earth anchor consisting of a plurality of separate members, the latter including anchor stages adapted to be inserted into preformed holes in the ground and, when inserted, inclined towards each other and towards the horizontal, said stakes being provided with bores intermediate the ends and at right angles to the respective axes of the stakes, a cross beam for joining the anchor stakes, provided with bifurcated ends having cheek plates provided with bores, adapted to straddle the anchor stakes, so as to align the bores in the cross beam with the bores of the anchor stakes, removable bolts inserted through the aligned bores, thus joining the anchor stakes pivotally to the cross beam, lugs intermediate the ends of the crossbeam provided with aligned bores projecting from said cross beam, means on the upper ends of the anchor stakes to draw said ends together, a soil testing plate and column, and a loading beam provided with a transverse bore at one end, adapted to be applied against the column and the soil testing plate, and a detachable pivot bolt pivotally connecting said loading beam with the lugs of said cross beam inserted through the transverse bore of the loading beam and bores in the lugs of the cross beam, said loading beam being weighted for applying pressure to the soil testing plate, while the reaction is taken up by the earth anchor.

4. A soil testing device as claimed in claim 3, wherein the loading beam consists of hinged units adapted to be folded upon each other.

References Cited in the file of this patent

UNITED STATES PATENTS

| Number | Name | Date |
|---|---|---|
| 1,169,496 | Knauff | Jan. 25, 1916 |
| 2,280,592 | Le Mieux, Jr. | Apr. 21, 1942 |

FOREIGN PATENTS

| Number | Country | Date |
|---|---|---|
| 286,480 | Great Britain | Mar. 8, 1928 |
| 575,050 | Germany | Apr. 25, 1933 |
| 425,725 | Italy | Oct. 10, 1947 |
| 68,412 | Holland | Aug. 15, 1951 |